United States Patent
Matsuura

(10) Patent No.: US 6,666,036 B2
(45) Date of Patent: Dec. 23, 2003

(54) FREEZER

(75) Inventor: Hideki Matsuura, Sakai (JP)

(73) Assignee: Daikin Industries, Ltd., Osaka (JP)

(*) Notice: Subject to any disclaimer, the term of this patent is extended or adjusted under 35 U.S.C. 154(b) by 291 days.

(21) Appl. No.: 09/958,739

(22) PCT Filed: Jan. 26, 2001

(86) PCT No.: PCT/JP01/00512

§ 371 (c)(1),
(2), (4) Date: Oct. 16, 2001

(87) PCT Pub. No.: WO01/61255

PCT Pub. Date: Aug. 23, 2001

(65) Prior Publication Data

US 2002/0134092 A1 Sep. 26, 2002

(30) Foreign Application Priority Data

Feb. 16, 2000 (JP) .................................. 2000-37914

(51) Int. Cl.⁷ ................................................ F25B 00/00
(52) U.S. Cl. ........................................................ 62/114
(58) Field of Search .......................... 62/114, 115, 467, 62/468, 498; 252/68

(56) References Cited

U.S. PATENT DOCUMENTS

| 5,553,465 A | * | 9/1996 | Fukunda et al. | ............... | 62/468 |
| 5,956,959 A | * | 9/1999 | Sunanga et al. | ............... | 62/114 |
| 5,984,647 A | | 11/1999 | Miyamoto et al. | | |
| 6,216,476 B1 | * | 4/2001 | Numoto et al. | ............... | 62/114 |

FOREIGN PATENT DOCUMENTS

| JP | 8-135572 | 5/1996 |
| JP | 9-151851 | 6/1997 |
| JP | 10-9139 | 1/1998 |
| JP | 10-103276 | 4/1998 |
| JP | 10-159730 | 6/1998 |
| JP | 10-281064 | 10/1998 |
| JP | 11-262207 | 9/1999 |
| JP | 11-293273 | 10/1999 |
| JP | 2000-129250 | 5/2000 |

* cited by examiner

Primary Examiner—William C. Doerrler
Assistant Examiner—Malik N. Drake
(74) Attorney, Agent, or Firm—Birch, Stewart, Kolasch & Birch, LLP

(57) ABSTRACT

Moisture in a refrigeration circuit is absorbed by means of a polyvinyl ether oil that has hygroscopicity and serves as a refrigerating machine oil. Therefore, even if a compressor comes to have an elevated temperature attributed to the employment of a refrigerant made of a single substance of R32, the insulating film of the built-in motor of the compressor is hard to hydrolyze. Moreover, by setting a saturated moisture amount of polyvinyl ether at a temperature of 30° C. and a relative humidity of 80% to 5000 ppm or more, a tensile strength retention rate of the motor insulating film made of PET or PEN, which can easily be processed, can be set to 50% or more, by which the deterioration of the insulating film can be prevented. Therefore, the performance of the refrigerating apparatus can be stabilized for a long term by avoiding the breakdown of the compressor.

1 Claim, 1 Drawing Sheet

FREEZER

This application is the national phase under 35 U.S.C. §371 of PCT International Application No. PCT/JP01/00512 which has an International filing date of Jan. 26, 2001, which designated the United States of America and was not published in English.

TECHNICAL FIELD

The present invention relates to a refrigerating apparatus that employs an HFC (hydrofluorocarbon) refrigerant.

BACKGROUND ART

Recently, there have been energetically developed refrigerating apparatuses that employ an HFC refrigerant in place of an HCFC (hydrochlorofluorocarbon) refrigerant. As the above-mentioned HFC refrigerant, there are R407C (mixture refrigerant of HFC32, HFC125 and HFC134a), R410A (mixture refrigerant of HFC32 and HFC125) and the like. However, the above-mentioned R407C and R410A refrigerants have high global warming effects although they take no ozone disrupting action, and the refrigerants have the drawback of poor cooling efficiency in a refrigerating apparatus since their coefficients of performance are low.

Accordingly, there is recently proposed a refrigerating apparatus that employs a single substance of R32 (difluoromethane) or an HFC refrigerant that has a principal ingredient of R32. The substance of R32, which has a lower global warming effect than that of the R407C and R410A refrigerant and has a high coefficient of performance, improves the cooling efficiency of the refrigerating apparatus.

However, in the refrigerating apparatus that employs the R32 refrigerant, a temperature when the refrigerant is discharged from a compressor during a compression process becomes about 20° C. higher than a temperature when the R407C refrigerant is employed, and therefore, the temperature of the compressor rises. On the other hand, an insulating film owned by a built-in motor of the compressor is made of polyethylene terephthalate (hereinafter referred to as PET) and polyethylene naphthalate (hereinafter referred to as PEN), which can easily be processed. However, these substances of PET and PEN have hydrolyzability. Therefore, when the compressor is the type that has a built-in motor, the insulating film is rapidly deteriorated as a consequence of the promotion of hydrolysis due to moisture in the refrigeration circuit by the high temperature of the compressor that employs R32. This consequently causes a problem that the insulation of the motor is destroyed and the compressor breaks down. The present inventor discovered the fact that the aforementioned problem exists when the refrigerant having a principal ingredient of R32 and the compressor having the built-in motor are employed.

This trouble does not occur when PPS (polyphenylene sulfide) or PEEK (polyether ether ketone), which do not cause hydrolysis and have a high heat-proof temperature, are employed for the insulating film, whereas there occurs the problems of cost increase and degradation of productivity due to hardness.

DISCLOSURE OF THE INVENTION

Accordingly, the object of the present invention is to provide a refrigerating apparatus, in which the insulating film of a compressor motor is inexpensive and has good processability without causing hydrolysis even when a refrigerant having a principal ingredient of R32 is employed, therefor assuring stable maintenance of its performance.

This object is obtained by a refrigerating apparatus having at least a compressor, a condenser, an expansion mechanism and an evaporator, comprising: a refrigerant having a principal ingredient of R32; and a refrigerating machine oil having hygroscopicity, the compressor including a built-in motor, and the motor having an insulating film made of a polymer resin that includes ester linkages.

According to the above refrigerating apparatus, the refrigerating machine oil has hygroscopicity and absorbs moisture in the refrigeration circuit while circulating through the refrigeration circuit. Therefore, even if the amount of water to be absorbed by the insulating film of the motor is decreased and the refrigerant having the principal ingredient of R32 comes to have an elevated temperature during the compression process to cause the elevated temperature of the compressor, the insulating film is hard to hydrolyze. That is, the insulating film is hard to deteriorate, and therefore, the refrigerating apparatus can stably maintain its performance.

According to a preferred embodiment of a refrigerating apparatus, the refrigerating machine oil is an ether oil.

According to the above refrigerating apparatus, the ether oil is stable with respect to water and does not cause hydrolysis. Therefore, the function of absorbing moisture in the refrigeration circuit is stably maintained. Therefore, the performance of the refrigerating apparatus is stabilized, preventing the deterioration of the insulating film for a long term. Moreover, the innate lubricating function is also stably maintained, and therefore, the performance of the refrigerating apparatus is stabilized.

According to a further preferred embodiment of a refrigerating apparatus, the insulating film of the motor is comprised of polyethylene terephthalate or polyethylene naphthalate.

According to the above refrigerating apparatus, the moisture in the refrigeration circuit is absorbed by the refrigerating machine oil. Therefore, the insulating film that belongs to the motor and is comprised of PET or PEN is hard to hydrolyze even in the compressor at an elevated temperature in spite of its hydrolyzability. That is, the insulating film is hard to deteriorate, and therefore, the breakdown of the compressor is avoided, and the performance of the refrigerating apparatus is stabilized.

According to a further preferred embodiment of a refrigerating apparatus, the refrigerant contains 70 wt % or more of R32.

According to the above refrigerating apparatus, the moisture in the refrigeration circuit is absorbed by the refrigerating machine oil despite that the refrigerant that contains 70 wt % or more of R32 comes to have an elevated temperature in the compressor. Therefore, the insulating film of the motor of the compressor is hard to hydrolyze. That is, the insulating film is hard to deteriorate, and therefore, the breakdown of the compressor is avoided, and the performance of the refrigerating apparatus is stabilized.

According to a further preferred embodiment of a refrigerating apparatus, the refrigerant is substantially comprised of a single substance of R32.

According to the above refrigerating apparatus, the moisture in the refrigeration circuit is absorbed by the refrigerating machine oil despite that the refrigerant that is substantially comprised of the single substance of R32 comes to have an elevated temperature in the compressor. Therefore, the insulating film of the motor of the compressor is hard to hydrolyze. That is, the insulating film is hard to deteriorate, and therefore, the breakdown of the compressor is avoided, and the performance of the refrigerating apparatus is stabilized.

According to a further preferred embodiment of a refrigerating apparatus, the refrigerating machine oil has a saturated moisture amount of 5000 ppm or more at a temperature of 30° C. and a relative humidity of 80%.

According to the above refrigerating apparatus, when the refrigerating machine oil has a saturated moisture amount of 5000 ppm or more at a temperature of 30° C. and a relative humidity of 80%, according to one experimental example, the tensile strength retention rate of PET or PEN that serves as the insulating film of the built-in motor of the compressor becomes 50% or more. That is, this refrigerating machine oil avoids deterioration of the insulating film by maintaining the strength of the insulating film. Therefore, the breakdown of the compressor is avoided, and the performance of the refrigerating apparatus is stabilized.

According to a further preferred embodiment of a refrigerating apparatus, the refrigerating machine oil is a polyvinyl ether oil.

According to the above refrigerating apparatus, the polyvinyl ether oil, which has hygroscopicity, absorbs the moisture in the refrigeration circuit to avoid the hydrolysis of the insulating film of the built-in motor of the compressor. That is, the breakdown of the compressor is avoided by preventing the deterioration of the insulating film. Moreover, the polyvinyl ether oil, which is stable with respect to water, stably keeps a water absorbing function and a lubricating function. Moreover, the polyvinyl ether oil, which has a miscibility to R32 that serves as a refrigerant, satisfactorily takes the lubricating function effect without causing the inconvenience of two-phase separation or the like. Furthermore, the polyvinyl ether oil, which has good electric insulating property, is suitable for the compressor with the built-in motor. Therefore, by using the polyvinyl ether oil for the refrigerating machine oil, the performance of the refrigerating apparatus is stabilized for a long term.

BEST MODE FOR CARRYING OUT THE INVENTION

Figure 1:
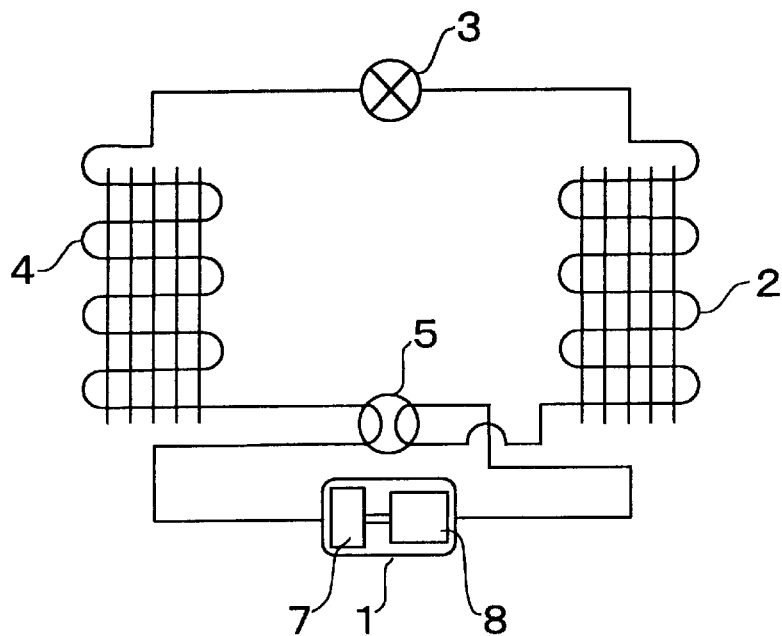
FIG. 1 is refrigeration circuit diagram of a refrigerating apparatus according to an embodiment of the present invention.

The present invention will be described in detail below on the basis of the embodiments thereof shown in the drawings.

FIG. 1 is a refrigeration circuit diagram of an air conditioner that serves as one example of the refrigerating apparatus of the present embodiment. This refrigeration circuit includes a compressor 1, an outdoor heat exchanger 2, an expansion mechanism 3, an indoor heat exchanger 4 and a four ports connection valve 5. The compressor 1 has a compressing section 7 and a built-in motor 8 for driving the compressing section 7. The motor 8 operates in an atmosphere of a refrigerant and a refrigerating machine oil. An insulating film is arranged between the phases of coils and laminate steel plates (which are not shown) of the motor 8 in order to maintain insulation between them. This insulating film has hydrolyzability and is made of PET or PEN, which can easily be processed.

In FIG. 1, a high-temperature high-pressure refrigerant gas discharged from the compressor 1 is condensed by the outdoor heat exchanger 2, expanded by the expansion mechanism 3, evaporated by the indoor heat exchanger 4 and fed back to the compressor 1 via the four ports connection valve 5. In the above course, the indoor air is deprived of the heat of evaporation to cool the inside of the room. By changing over the four ports connection valve 5, the indoor air is heated by the heat of condensation using the indoor heat exchanger 4 as a condenser. It is to be noted that either one of the cooling or heating function may be provided by removing the four ports connection valve 5 from the structure shown in FIG. 1.

In the present embodiment, a single substance of R32 is employed as a refrigerant, and a polyvinyl ether oil is employed as a refrigerating machine oil. This polyvinyl ether oil, which has hygroscopicity, absorbs the moisture that has entered the refrigeration circuit during the manufacturing and constructing processes of the compressor and the refrigerating apparatus. On the other hand, the single substance of R32 has a temperature being about 20° C. higher than that of the conventional R407C refrigerant when discharged from the compressor 1, and therefore, the compressor 1 comes to have an elevated temperature. However, the amount of moisture retained by the insulating film is reduced since the refrigerating machine oil absorbs the moisture that has entered the inside of the refrigeration circuit. Therefore, the insulating film, which is made of PET or PEN provided for the motor 8 of the compressor 1, is hard to hydrolyze even in the compressor 1 at an elevated temperature despite that it is a hydrolyzable resin. Therefore, the insulating film does not deteriorate to maintain the insulation of the motor 8. Therefore, the breakdown of the compressor 1 is avoided, and consequently the performance of the air conditioner can be stably maintained.

Figure 2:
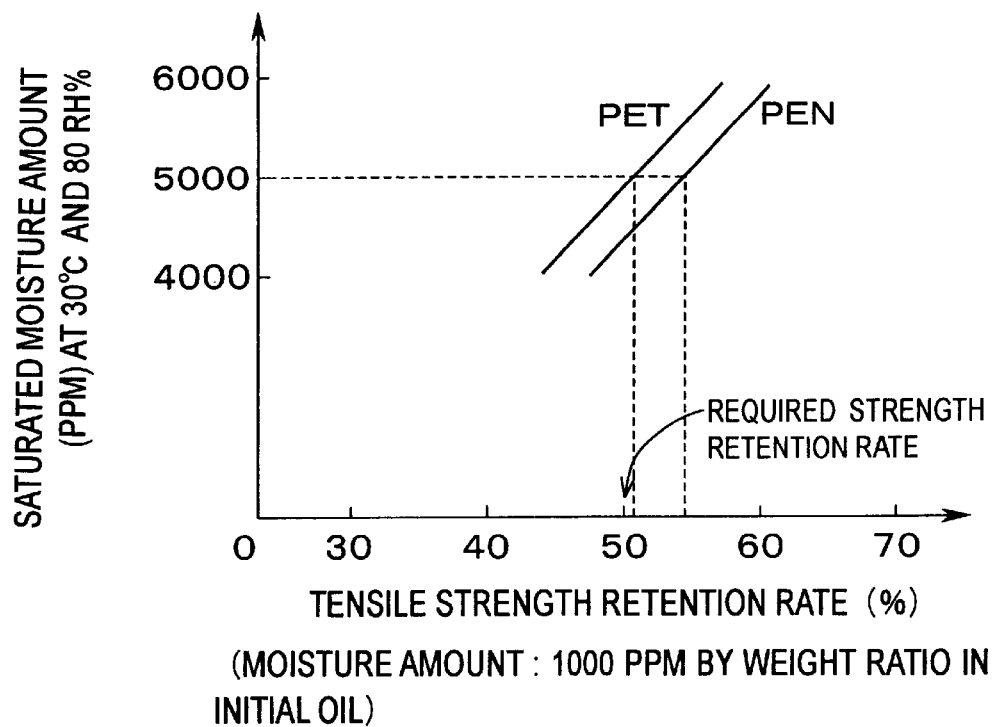
FIG. 2 is a graph showing a relation between the hygroscopicity of a polyvinyl ether oil employed as a refrigerating machine oil for use in the refrigerating apparatus shown in FIG. 1 and the strength retention rate of PET and PEN that serve as the insulating film of the built-in motor of the compressor.

The hygroscopicity of the polyvinyl ether oil has a correlation to the strength retention rate of the PET and PEN. FIG. 2 shows a relation between the saturated moisture amount of the polyvinyl ether oil at a temperature of 30° C. and a relative humidity of 80% to the tensile strength retention rate of the PET and PEN. The tensile strength retention rate of the PET and PEN is the tensile strength retention rate after immersion in a mixed liquid of the single substance of R32 and the polyvinyl ether oil at a temperature of 140° C. for 500 hours. As is apparent from FIG. 2, if the saturated moisture amount of the polyvinyl ether oil is increased, i.e., if the moisture absorption amount inside the refrigeration circuit by the refrigerating machine oil is increased when the amount of moisture entering the inside of the refrigeration circuit has a constant amount of 1000 ppm by weight ratio to the refrigerating machine oil, then the tensile strength retention rate of PET and PEN that serves as the insulating film is improved.

A field test using actual compressor has revealed that the PET and PEN employed as a motor insulating film is required to have a tensile strength retention rate of about 50%. According to FIG. 2, the saturated moisture amount of the polyvinyl ether oil when the tensile strength retention rate of both PET and PEN exceeds 50% is 5000 ppm at a temperature of 30° C. and a relative humidity of 80%. Then, since the hygroscopicity of the polyvinyl ether oil has a correlation to the strength retention rate of the PET and PEN as described above, by employing the polyvinyl ether oil of which the saturated moisture amount at a temperature of 30° C. and a relative humidity of 80% is not less than 5000 ppm, the deterioration of the insulating film can be prevented by securing the strength of the PET and PEN.

Furthermore, the polyvinyl ether oil is stable with respect to moisture, and therefore, its moisture absorbing ability and a lubricating ability can take effect for a long term. Moreover, the polyvinyl ether oil, which has miscibility to the single substance of R32, satisfactorily takes the lubricating function effect without causing the inconvenience of two-phase separation or the like. Furthermore, the polyvinyl ether oil, which has a good electric insulating property, is suitable for the built-in motor type compressor. Therefore, the polyvinyl ether oil can maintain the performance of the refrigerating apparatus of the aforementioned embodiment for a long term.

Although the description has been made on the basis of the air conditioner taken as an example in the aforementioned embodiment, a refrigerator-freezer or the like is acceptable.

Although the single substance of R32 is employed as the refrigerant in the aforementioned embodiment, for example, a refrigerant that contains 70 wt % or more of R32 takes quite the same operative effect, and a roughly similar operative effect can be obtained by a refrigerant that has a principal ingredient of R32.

Although the polyvinyl ether oil, of which the saturated moisture amount at a temperature of 30° C. and a relative humidity of 80% is not less than 5000 ppm, is employed as the refrigerating machine oil in the aforementioned embodiment, the refrigerating machine oil may be another one so long as hygroscopicity is owned.

Although the insulating film of the motor provided for the compressor is made of PET or PEN in the aforementioned embodiment, another polymer resin that includes ester linkages is acceptable.

The refrigerating apparatus of the present invention can be applied to either a separate type in which the condenser and the evaporator are separated and connected together via a refrigerant pipe or a multiple type that has a plurality of condensers or evaporators.

What is claimed is:

1. A refrigerating apparatus having at least a compressor (1), a condenser (2), an expansion mechanism (3) and an evaporator (4), comprising:

a refrigerant having a principal ingredient of R32; and a refrigerating machine oil having a principal ingredient of polyvinyl ether oil having a saturated moisture amount of 5000 ppm or more at a temperature of 30° C. and a relative humidity of 80%, wherein the compressor (1) includes a built-in motor (8), wherein said motor (8) has an insulating film made of a polymer resin that includes ester linkages.

* * * * *